June 24, 1941.  W. H. CHURCHILL  2,246,720
FASTENER MEMBER AND FASTENER INSTALLATION
Filed June 21, 1939
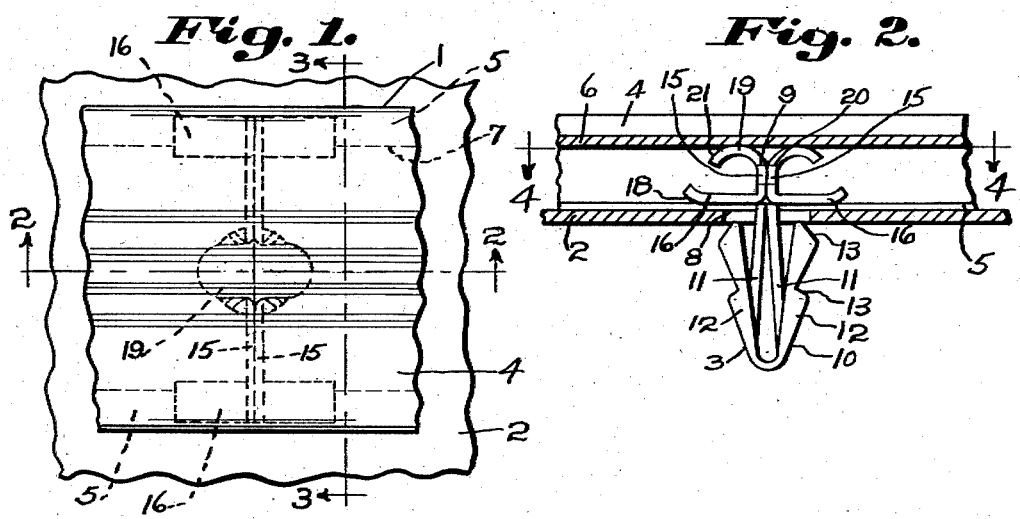
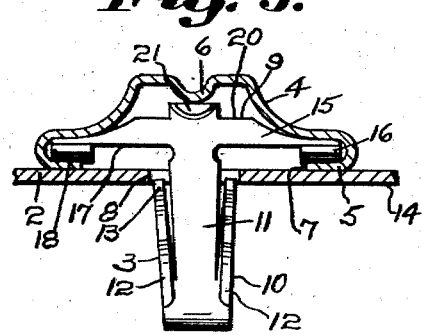
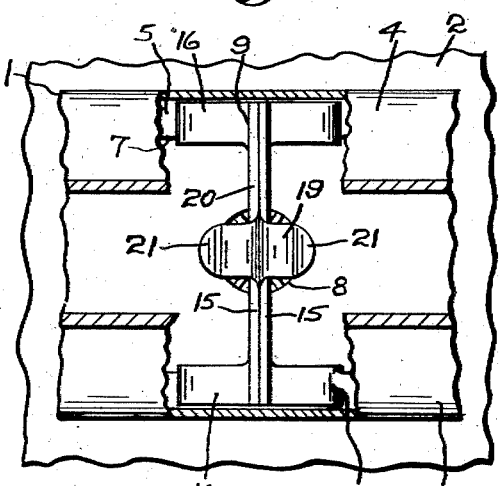
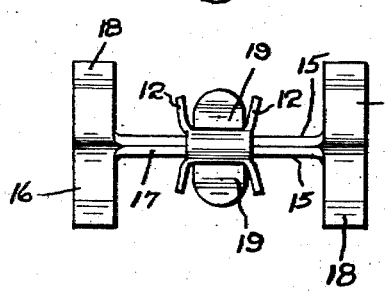
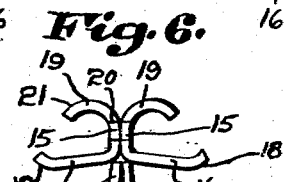
Inventor:
Wilmer H. Churchill.
By John Todd
Att'y.

Patented June 24, 1941

2,246,720

UNITED STATES PATENT OFFICE 2,246,720

FASTENER MEMBER AND FASTENER INSTALLATION

Wilmer H. Churchill, Saugus, Mass., assignor to United-Carr Fastener Corporation, Cambridge, Mass., a corporation of Massachusetts Application June 21, 1939, Serial No. 280,289

5 Claims. (Cl. 189—88)

This invention relates to improvements in snap fastener members of the type designed for attaching two apertured bodies together and installations of the same.

In the drawing, in which I have illustrated a preferred embodiment of my invention:

Fig. 1 is a front elevation of a molding strip secured to a supporting structure with my improved fastener member shown in dotted lines;

Fig. 2 is a sectional view taken along the line 2—2 of Fig. 1 and showing the fastener member in elevation;

Fig. 3 is a sectional view taken along the line 3—3 of Fig. 1;

Fig. 4 is a view similar to Fig. 1 with a portion of the molding cut away showing the fastener member;

Fig. 5 is a bottom plan view of my improved fastener member per se; and

Fig. 6 is an end plan view of a portion of the fastener member shown in Fig. 5.

My invention, as illustrated in the accompanying drawing, relates specifically, though not exclusively, to a fastener secured installation in which a hollow body such as a molding strip and the like is quickly and easily attached to a supporting structure, such as the frame of an automobile, by means of my improved fastener member.

The particular installation which I have chosen for the purpose of illustrating my invention includes a hollow sheet metal part such as an elongated molding strip 1 secured to a supporting structure 2 by means of my improved fastener member 3. The molding strip 1 is of the type commonly used for ornamenting exterior surfaces of an automobile and has a hollow outer side 4 and an inner side 5 spaced from the outer side. The strip 1 is open at at least one of its longitudinal ends enabling the fastener member to be moved therethrough into assembly with the strip, as will be described. The outer side 4 may have a corrugation 6 extending longitudinally of the strip and into the hollow of the molding and having a cross-sectional shape substantially as shown in Fig. 3. The inner side 5 has an opening 7 (Figs. 3 and 4) running longitudinally thereof and the supporting structure 2, which is preferably of thin metal, has an aperture 8 to receive a stud means of the fastener 3.

Referring in detail to my preferred form of fastener member, I have shown a fastener of simple construction formed from one piece of sheet metal. The fastener member 3 in my preferred construction comprises a base portion 9 adapted to be assembled within the hollow body of the molding strip 1 by relative longitudinal movement through the opening at one of the longitudinal ends of the strip and a stud means 10 extending beneath the base 9 for engagement with the support 2 through the aperture 8. The stud means 10 may be of any suitable construction, but in my preferred form I have shown one having a pair of oppositely-disposed yieldable legs 11—11 (Figs. 2 and 3) connected at their ends away from the base 9 and wing portions 12 integrally joined to said respective legs near said connected ends. The wing portions 9 are provided with shoulders 13 facing the base 9 and adapted to engage the inner surface 14 (Fig. 3) of the support 2 adjacent the aperture 8. The base 9, the construction of which is the chief feature of my present invention, comprises a pair of arms 15—15 integrally joined at substantially their mid-portions to respective ends of the legs 11—11 opposed to their connected ends so that each leg, together with the respective arm 15, forms a substantially T-shaped portion, as most clearly shown in Fig. 3. The planes of the arms 15—15 are normally disposed in vertical substantially parallel relation with the inner broad surfaces of the arms in close relation. Each of the arms 15 has a pair of yieldable attaching portions in the form of projections 16 disposed at opposite ends and extending laterally in substantially horizontal relation to the plane of the respective arm from the lower edge 17 thereof. Normally the yieldable attaching portions 16 extend from the respective arm 15 slightly downwardly in the direction of the stud means 10 so as to form an obtuse angle with the arm 15, as most clearly shown in Fig. 6, to effect resilient engagement with the sides of the molding in final assembly of the parts, as will be described. Portions adjacent the free ends of the arms 15 extend upwardly away from the stud means 10 so as to form curved camming portions 18 on their lower surface to aid in effecting assembly of the base with the molding strip. Each of the arms 15—15 has another attaching portion in the form of an ear 19 extending from the upper edge 20 of the respective arm at substantially the mid-portion. The ears 19 extend outwardly away from each other and in planes substantially parallel to the planes of the projections 16. The material adjacent the free ends of the ears 19 is curved downwardly providing a curved surface 21 on the upper sides for facilitating entrance of the fastener member into the molding.

Assembly of my fastener member with the molding strip 1 is a relatively simple matter and is carried out through moving the base 9 toward an open end of the molding to engage the camming surfaces 18 of the attaching portions 16 on one side of the fastener with the free edges of the inner side 5 adjacent the open end of the molding and the curved surface 21 of the ear 19 with the free edge of the corrugation 6 adjacent the open end of the molding. As pressure is exerted on the fastener member to move the base 9 into the molding longitudinally of the molding, the arms 16 are raised in the direction of the ears 19. After the fastener base has been disposed within the molding, the attaching portions 16 resiliently engage the inner side 5 and cooperate with the ears 19, which engage the corrugation 6 (Fig. 2), to prevent relative play between the parts. Furthermore, the attaching portions 16 and 19 cooperate to engage the molding under tension so as to prevent relative longitudinal movement of the fastener member relative to the molding. In this manner each stud member is held in a given position with relation to the trim strip against accidental movement. Thus it will be seen by my improved fastener member that I am enabled to effect quick and easy assembly of the fastener base with the molding and at the same time the particular construction of my fastener member provides a secure and non-rattle attachment. After the fastener base 9 has been assembled with the molding strip, the molding strip may be secured to the support 2 through snapping the stud means 10 of the fastener member through the aperture 8 of the support to engage the shoulders 13 of the stud means behind the support (Figs. 2 and 3) in a manner well known in the art. Although I have shown only one fastener member secured to the molding strip 1, it is understood that as many fastener members may be provided as are necessary for securing the molding to the support.

Although I have illustrated and described a preferred embodiment of my invention, I do not wish to be limited thereby because the scope of my invention is best defined in the following claims.

I claim:

1. A fastener installation comprising, in combination, an elongated hollow part having an inner side and an outer side spaced from said inner side, said inner side having an elongated opening therein, said hollow part being open at at least one end thereof, and a fastener member secured to said part through relative longitudinal movement through said open end, said fastener having a base seated within said hollow part and yieldable legs extending through said elongated opening and having means for attaching the part to a support, said base comprising a pair of substantially vertical arms having their inner broad surfaces in close relation, said arms having laterally extending substantially horizontal attaching portions disposed in spaced planes for engaging said inner and outer sides of said hollow part, said arms being disposed within said hollow part in transverse relation to the major axis of said elongated opening and certain of said attaching portions being yieldable and in spring engagement with a side of said hollow part to limit movement of said fastener longitudinally of said part.

2. A fastener installation comprising, in combination, a hollow molding strip having an inner side and an outer side spaced from said inner side, said inner side having an elongated opening therein, said fastener member having a base seated within said molding strip and yieldable legs extending through said opening and having means for attaching the strip to another member, said base comprising a pair of arms disposed within said molding in transverse relation to the major axis of said opening with the planes of the broad surfaces of said arms in substantially perpendicular relation to the plane of said inner side, attaching portions integral with the upper edges of said arms extending in angular relation to the normal planes of said arms engaging the outer side of said molding, and attaching portions integral with the lower edges of said arms extending in angular relation to the normal planes of said arms and engaging the inner side of said molding, and certain of said attaching portions being yieldable and in spring engagement with a side of said hollow part to limit movement of said fastener longitudinally of said part.

3. A fastener installation comprising, in combination, a hollow molding strip having an inner side and an outer side spaced from said inner side, said inner side having an elongated opening therein, said fastener member having a base seated within said molding strip and yieldable legs extending through said opening and having means for attaching the strip to another member, said base comprising a pair of arms disposed within said molding in transverse relation to the major axis of said opening with the planes of the broad surfaces of said arms in substantially perpendicular relation to the plane of said inner side, substantially stiff attaching portions integral with the upper edges of said arms extending in angular relation to the normal planes of said arms and engaging the outer side of said molding, and yieldable attaching portions integral with the lower edges of said arms extending in angular relation to the normal planes of said arms and engaging the inner side of said molding under spring tension, and said rigid and yieldable attaching portions cooperating with said hollow part to limit movement of said fastener longitudinally of said part.

4. A fastener member comprising a base adapted to be seated within a hollow part and a pair of yieldable spaced-apart legs extending beneath said base, said legs being connected at their ends away from said base and having yieldable means for fastener engagement through an aperture of another part, said base comprising a pair of arms integral with the ends of said respective legs opposed to their connected ends, the broad surfaces of said arms being disposed in substantially vertical planes, an attaching portion extending substantially horizontally outwardly from an upper edge of each of said arms for engaging an outer side of said hollow part and an attaching portion extending substantially horizontally outwardly from a lower edge of each of said arms for engaging an inner side of said hollow part, and one of said attaching portions of each of said arms being yieldable relative to the other attaching portion thereof.

5. A fastener member comprising a base adapted to be seated within a hollow part and a pair of yieldable spaced-apart legs extending beneath said base, said legs being connected at their ends away from said base and having yieldable means for fastener engagement through an aperture of another part, said base comprising a pair of arms integral with the ends of said respective legs opposed to their connected ends, the broad surfaces of said arms being disposed in substantially vertical planes, attaching portions extending substantially horizontally outwardly from the upper edges of said arms for engaging an outer side of said hollow part and attaching portions extending substantially horizontally outwardly from the lower edges of said arms for engaging an inner side of said hollow part, said attaching portions having curved camming surfaces adjacent their free ends for facilitating entrance of said fastener member into said molding through an open end of said molding, and certain of said attaching portions being yieldable for spring engagement with said molding.

WILMER H. CHURCHILL.